US012763445B2

(12) United States Patent
Brown

(10) Patent No.: US 12,763,445 B2
(45) Date of Patent: Oct. 13, 2026

(54) IMPEDANCE ADAPTOR

(71) Applicant: SAT-COM (PTY) LTD, Windhoek (NA)

(72) Inventor: David Kenneth Brown, Windhoek (NA)

(73) Assignee: SAT-COM (PTY) LTD, Windhoek (NA)

( * ) Notice: Subject to any disclaimer, the term of this patent is extended or adjusted under 35 U.S.C. 154(b) by 172 days.

(21) Appl. No.: 18/702,259

(22) PCT Filed: Oct. 3, 2022

(86) PCT No.: PCT/IB2022/059424
§ 371 (c)(1),
(2) Date: Apr. 17, 2024

(87) PCT Pub. No.: WO2023/067420
PCT Pub. Date: Apr. 27, 2023

(65) Prior Publication Data

US 2025/0210836 A1 Jun. 26, 2025

(30) Foreign Application Priority Data

Oct. 19, 2021 (GB) ..................................... 2114922

(51) Int. Cl.
*H01P 1/00* (2006.01)
*H01P 3/02* (2006.01)

(52) U.S. Cl.
CPC . *H01P 1/00* (2013.01); *H01P 3/02* (2013.01)

(58) Field of Classification Search
CPC .... H01P 1/00; H01P 3/02; H01P 3/003; H01P 3/08; H03F 3/60; H03F 2200/451;
(Continued)

(56) References Cited

U.S. PATENT DOCUMENTS 3,729,694 A 4/1973 Huntington et al.
3,965,445 A 6/1976 Ou
(Continued)

FOREIGN PATENT DOCUMENTS

DE 199 15 649 A1 10/2000
EP 1 043 736 A1 10/2000
WO WO 01/80349 A1 10/2001

OTHER PUBLICATIONS

International Search Report and Written Opinion received in International Application No. PCT/IB2022/059424 mailed on Feb. 24, 2023.

(Continued)

*Primary Examiner* — John W Poos

(74) *Attorney, Agent, or Firm* — Knobbe, Martens Olson & Bear, LLP

(57) ABSTRACT

An impedance adaptor is provided, including first and second transmission lines, each of which is provided by an arm and includes a first conductor and a second conductor. The transmission lines are arranged such that the first conductor of the first transmission line is adjacent and co-planar with the first conductor of the second transmission line, and the second conductor of the first transmission line is adjacent and co-planar with the second conductor of the second transmission line. A first end of the first conductor of the first transmission line is electrically coupled to a first end of the first conductor of the second transmission line. A first end of the second conductor of the first transmission line is electrically coupled to a first end of the second conductor of the second transmission line.

19 Claims, 7 Drawing Sheets

(58) Field of Classification Search
CPC .... H03F 1/565; H01F 19/06; H01F 2017/065; H01F 2017/067; H01F 2027/2809; H01F 19/04; H01F 27/2847; H01F 2027/2819; H03H 7/38; H01L 23/5227
See application file for complete search history.

(56) References Cited

U.S. PATENT DOCUMENTS

| | | | | |
|---|---|---|---|---|
| 4,283,694 | A | 8/1981 | Pauker | |
| 4,295,107 | A | 10/1981 | Perlow | |
| 5,357,050 | A | 10/1994 | Baran et al. | |
| 5,945,890 | A | 8/1999 | McCorkle | |
| 6,639,487 | B1 | 10/2003 | Salmela et al. | |
| 8,077,006 | B2 | 12/2011 | Mui | |
| 8,558,355 | B2 * | 10/2013 | Chen | H10D 1/62 257/659 |
| 10,396,419 | B2 * | 8/2019 | Wu | H01P 1/20 |
| 2006/0139117 | A1 * | 6/2006 | Brunker | H05K 1/024 333/1 |
| 2015/0318107 | A1 | 11/2015 | Hecht | |
| 2018/0082778 | A1 * | 3/2018 | Roberg | H03H 7/38 |

OTHER PUBLICATIONS

Combined Search and Examination Report in GB Application No. GB 2114922.4 dated Nov. 29, 2021.
Examination Report under Section 18(3) in GB Application No. GB 2114922.4 dated Aug. 1, 2023.

* cited by examiner

IMPEDANCE ADAPTOR

CROSS-REFERENCE TO RELATED APPLICATIONS

This application claims priority from United Kingdom patent application number 2114922.4 filed on 19 Oct. 2022, which is incorporated by reference herein.

FIELD OF THE TECHNOLOGY

The technology described herein relates to an impedance adaptor. In particular, the technology described herein relates to a radio-frequency (RF) impedance adaptor.

BACKGROUND

To prevent power losses and signal distortion when connecting electronic circuits, devices or transmission lines, a first electronic circuit often needs an impedance adaptor to match its output impedance to an impedance of a second electronic circuit to which it is being connected, as is the case, for example, when an RF amplifier with a low output impedance of 12.5 Ohm needs to be connected to a standard 50-Ohm cable. A tapered transmission line starting at 50 Ohm on one end and reducing to 12.5 Ohm on the other end of % wave length of operating frequency could be optimum.

Transmission line transformers have been used as a method of solving matching and coupling impedances and RF amplifiers, antennas and other circuits. These transformers, which often match impedances through the manipulation of the number of turns in adjacent coils, rely on magnetic flux transfer and are less useful at radio frequencies because the magnetic core materials do not change their polarity at the rate of radio frequencies, particularly with broadband systems in the sub-gigahertz (GHz) range.

Coaxial cables of various impedances may be used to realize a transformation from input to output or vice versa of RF circuits. However, coaxial cables are manufactured in specific impedances (for example, 50 Ohm). The designer is often faced with a compromised impedance as the coaxial cable of the optimised impedance is not available or would be too expensive to custom manufacture.

The coaxial cables used in RF transmission line transformers are often difficult to form in the desired form-factor, especially if magnetic core materiel is used (this varies from magnetic binocular cores to E-cores, I-cores, beads and toroids). Transformers that are made using semi-rigid copper transmission lines or similar construction are also difficult to bend and are normally handmade which allows for small errors in the construction process that causes variation in the repeatable performance of application.

Impedance matching for RF applications has therefore sometimes been achieved by ad hoc constructions, such as through the twisting of isolated wire strands (which can only achieve higher impedances) or through the surrounding of a positive wire strand with several negative wire strands (which is limited to applications requiring only balanced lines and results in uneven power losses). The twisted transmission line impedance does vary over the length of the line, and the resulting impedance is difficult to control with these constructions.

Printed circuit board (PCB) transmission lines have also been used for impedance matching, with common configurations being the microstrip and strip-line transmission lines and their variations, whether covered or embedded. However, these transmission lines are limited because they require a ground or return conductor.

There is accordingly scope for improvement.

The preceding discussion of the background is intended only to facilitate an understanding of the present invention. It should be appreciated that the discussion is not an acknowledgment or admission that any of the material referred to was part of the common general knowledge in the art as at the priority date of the application.

SUMMARY

In accordance with an aspect of the technology there is provided an impedance adaptor comprising a first transmission line and a second transmission line, each of the first transmission line and the second transmission line being provided by an arm and having a first conductor and a second conductor, the conductors of each of the first transmission line and the second transmission line being aligned such that one is on top of the other, with:

- a first end of the first conductor of the first transmission line being proximate a first end of the second conductor of the first transmission line and a second end of the first conductor of the first transmission line being proximate a second end of the second conductor of the first transmission line, and
- a first end of the first conductor of the second transmission line being proximate a first end of the second conductor of the second transmission line and a second end of the first conductor of the second transmission line being proximate a second end of the second conductor of the second transmission line,
- wherein respective arms providing the first transmission line and the second transmission line are spaced apart and arranged such that the first conductor of the first transmission line is adjacent and co-planar with the first conductor of the second transmission line and the second conductor of the first transmission line is adjacent and co-planar with the second conductor of the second transmission line,
- and wherein the first end of the first conductor of the first transmission line is electrically coupled to the first end of the first conductor of the second transmission line by way of a continuation of the conductor between these ends, and wherein the first end of the second conductor of the first transmission line is electrically coupled to the first end of the second conductor of the second transmission line by way of a continuation of the conductor between these ends.

The transmission lines may be supported by a support forming a set of spaced apart arms on which each of the respective transmission lines are provided.

Each of the first transmission line and the second transmission line may be provided by respective portions of a substrate having the first conductor of that transmission line on a first major side of the portion of substrate and the second conductor of that transmission line on a second major side of the portion of substrate. The portion of substrate providing the first transmission line and the portion of substrate providing the second transmission line may be integrally formed, wherein the portions of substrate on which the conductors are provided form arms with an intermediate portion of substrate extending between the two arms from one end thereof so as to space the arms and the transmission lines apart. The portions of substrate providing the first transmission line and the second transmission line may be integrally formed from a single piece of substrate material. The conductors of each of the first transmission line and the second transmission line may be aligned such that one is on top of the other in the direction of the thickness of the substrate.

Each of the first conductor and the second conductor of each of the first transmission line and the second transmission line is provided by a conductive trace. Each of the first conductive trace and the second conductive trace of one or both of the first transmission line and the second transmission line may taper in width from the first end thereof to the second end thereof, or from the second end thereof to the first end thereof. The taper may be arranged such that the width of the first end provides an impedance approximate an input impedance and the width of the second end provides an impedance approximate an output impedance.

The second end of the first conductor of the first transmission line may be capable of being electrically coupled to the second end of the second conductor of the second transmission line, wherein:

the first end of the first conductor of the first transmission line provides a port A;

the first end of the second conductor of the second transmission line provides a port B;

the second end of the second conductor of the first transmission line provides a port C; and, the second end of the first conductor of the second transmission line provides a port D, and wherein the impedance adaptor is a 4:1 impedance transformer in which a low impedance input is between ports A and B and a high impedance output is between ports C and D.

The conductors of each of the first transmission line and the second transmission line may be generally straight between their respective ends.

The substrate may be U-shaped having two, spaced apart arms joined together at one end thereof, with each transmission line extending along one of the arms.

The second end of the second conductor of the first transmission line may be capable of being electrically coupled to the first end of the first conductor of the first transmission line. The second end of the first conductor of the second transmission line may be capable of being electrically coupled to the first end of the second conductor of the second transmission line, wherein:

the first end of the first conductor of the first transmission line provides a port A;

the first end of the second conductor of the second transmission line provides a port B;

the second end of the first conductor of the first transmission line provides a port C; and, the second end of the second conductor of the second transmission line provides a port D, wherein the impedance adaptor is a 9:1 impedance transformer in which a low impedance input is between ports A and B and a high impedance output is between ports C and D.

The conductors of each of the first transmission line and the second transmission line may be arranged in a U-shape such that the ends of the traces are proximate one another.

The conductors of each of the first transmission line and the second transmission line may be arranged in a hook-shape such that the ends of the traces are proximate one another.

The impedance adaptor may include a central transmission line, wherein the first end of the first conductor of the first transmission line, a first end of a first conductor of the central transmission line and the first end of the first conductor of the second transmission line are electrically coupled to one another, and wherein the first end of the second conductor of the first transmission line, a first end of a second conductor of the central transmission line and the first end of the second conductor of the second transmission line are electrically coupled to one another.

Portions of the substrate providing each of the first transmission line and second transmission line respectively may be U-shaped, wherein an end of each of the U-shaped portions of substrate are joined together by an intermediate portion of substrate.

Portions of the substrate providing each of the first transmission line and second transmission line respectively may be hook-shaped, wherein an end of each of the hook-shaped portions of substrate are joined together by an intermediate portion of substrate.

The impedance adaptor may be provided for integration in a form in which the second ends of the conductors of the transmission lines are not connected to any of the other conductors of the impedance adaptor.

In accordance with another aspect of the technology there is provided an apparatus including an impedance adaptor as defined above.

In the apparatus, the second end of the first conductor of the first transmission line may be electrically coupled to the second end of the second conductor of the second transmission line. The impedance adaptor may be a 4:1 impedance transformer.

In the apparatus, the second end of the second conductor of the first transmission line may be electrically coupled to the first end of the first conductor of the first transmission line. The second end of the first conductor of the second transmission line may be electrically coupled to the first end of the second conductor of the second transmission line. The impedance adaptor may be a 9:1 impedance transformer.

In the apparatus, the impedance adaptor may include a central transmission line. The second end of the second conductor of the first transmission line may be electrically coupled to a second end of a first conductor of the central transmission line. The second end of the first conductor of the second transmission line may be electrically coupled to a second end of a second conductor of the central transmission line. The impedance adaptor may be a 9:1 impedance transformer.

The apparatus may include a ferrite core, wherein arms of the impedance adaptor pass through the respective openings of the ferrite core and extend out from opposite ends thereof.

In accordance with another aspect of the technology there is provided an impedance adaptor comprising a first transmission line and a second transmission line, each of the first transmission line and the second transmission line being provided by a first conductive trace and a second conductive trace, the conductive traces of each of the first transmission line and the second transmission line being aligned such that one is on top of the other, with:

a first end of the first trace of the first transmission line being proximate a first end of the second trace of the first transmission line and a second end of the first trace of the first transmission line being proximate a second end of the second trace of the first transmission line, and a first end of the first trace of the second transmission line being proximate a first end of the second trace of the second transmission line and a second end of the first trace of the second transmission line being proximate a second end of the second trace of the second transmission line, wherein each of the first transmission line and the second transmission line is provided by respective portions of a substrate having the first conductive trace on a first major side thereof and the second conductive trace on a second major side thereof, wherein the portion of substrate providing the first transmission line and the portion of substrate providing the second transmission line are integrally formed with the portions of substrate on which the conductive traces are provided forming arms with an intermediate portion of substrate extending between the two arms from one end thereof so as to space the arms and the transmission lines apart, wherein the first transmission line and the second transmission line are arranged such that the first conductive trace of the first transmission line is adjacent and co-planar with the first conductive trace of the second transmission line and the second conductive trace of the first transmission line is adjacent and co-planar with the second conductive trace of the second transmission line, and wherein the first end of the first trace of the first transmission line is electrically coupled to the first end of the first trace of the second transmission line by way of a continuation of the conductive trace between these ends, and wherein the first end of the second trace of the first transmission line is electrically coupled to the first end of the second trace of the second transmission line by way of a continuation of the conductive trace between these ends.

Embodiments of the technology will now be described, by way of example only, with reference to the accompanying drawings.

DETAILED DESCRIPTION WITH REFERENCE TO THE DRAWINGS

Figure 1:
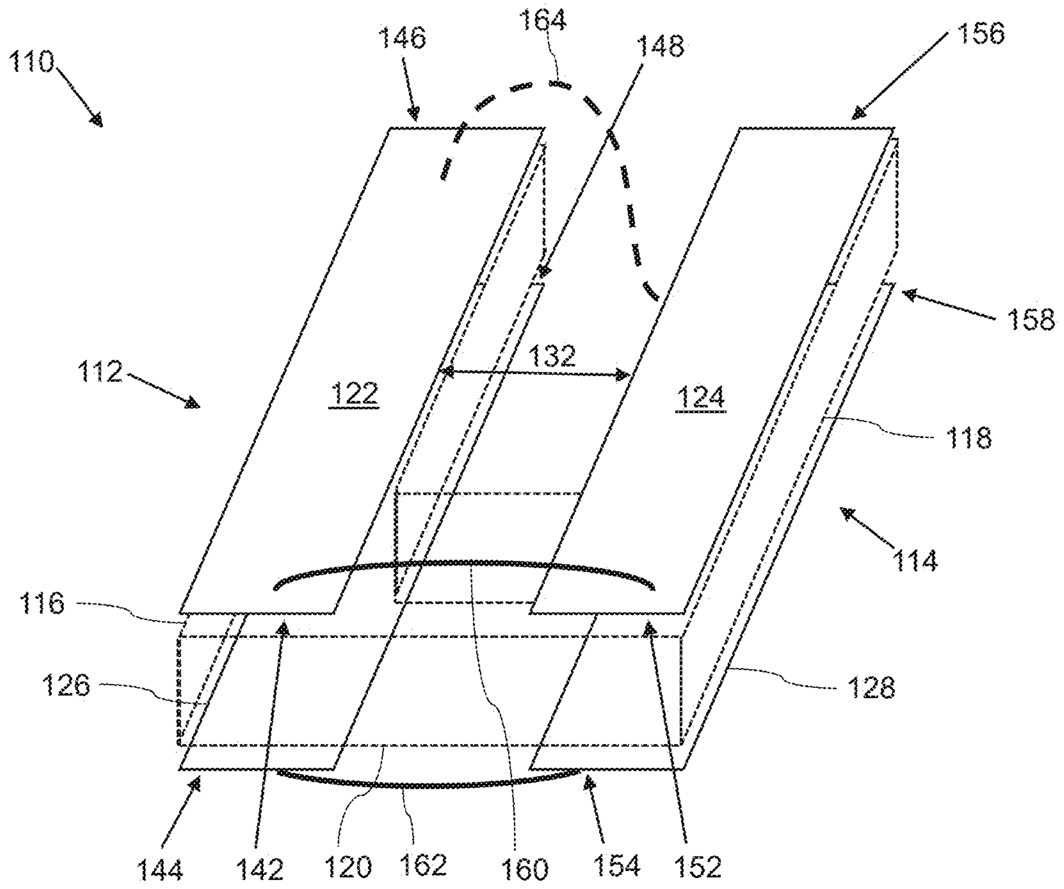
FIG. 1 is a three-dimensional schematic diagram which illustrates an impedance adaptor according to an embodiment of the present disclosure.
Figure 2:
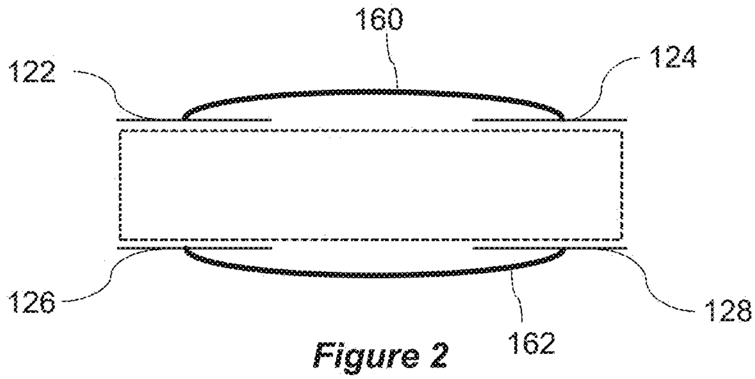
FIG. 2 is a schematic diagram which illustrates the impedance adaptor of FIG. 1 from a first end thereof.
Figure 3:
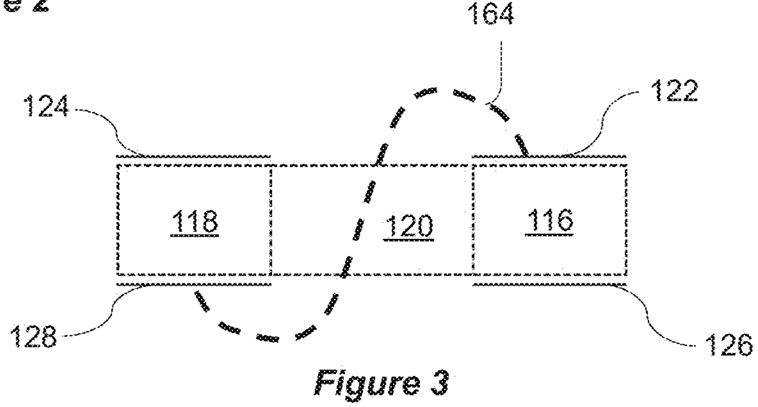
FIG. 3 is a schematic diagram which illustrates the impedance adaptor of FIG. 1 from a second end thereof.
Figure 4:
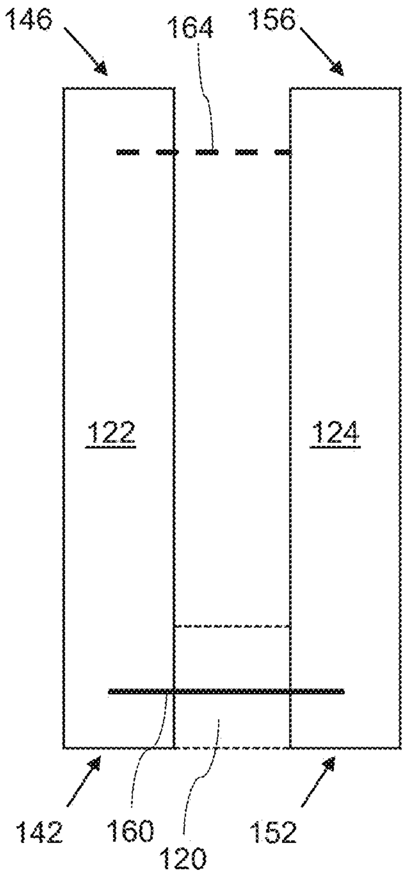
FIG. 4 is a schematic diagram which illustrates the impedance adaptor of FIG. 1 from a top view thereof.
Figure 5:
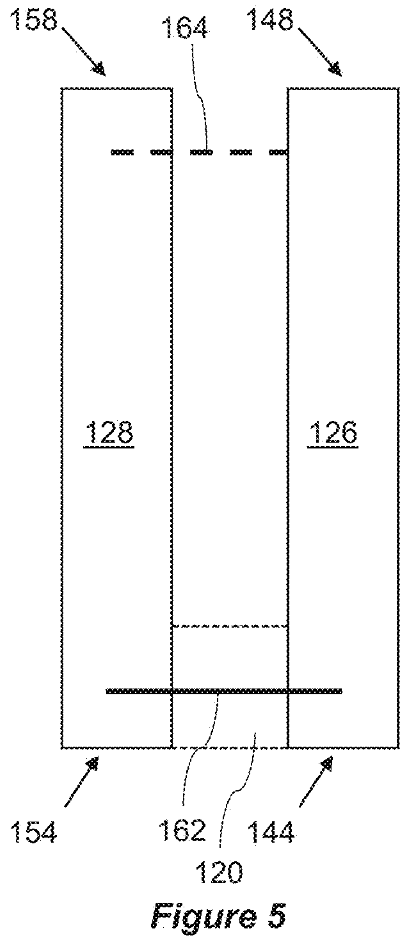
FIG. 5 is a schematic diagram which illustrates the impedance adaptor of FIG. 1 from a bottom view thereof.

Aspects of the present disclosure relate to an impedance adaptor, and particularly to a radio-frequency (RF) impedance adaptor. The impedance adaptor described herein may be a transmission line impedance adaptor. The impedance adaptor may be a wideband impedance adaptor. For example, some embodiments may be configured for operation between 30 and 520 megahertz (MHz). Other embodiments may be configured, for example, for operation between 1 and 600 MHz, or the like. Other wideband ranges of operation may be provided. The impedance adaptor may be a non-flux or equal delay transmission line impedance adaptor. The impedance adaptor may be an impedance transformer. Some embodiments of the impedance adaptor described herein may be in the form of or electrically equivalent to a Guanella Bal-Bal transformer.

In particular, aspects of the present disclosure provide what may be termed "an inverted" impedance adaptor arrangement in that at least one of the transmission lines is inverted (or rotated 180 degrees about a longitudinally extending axis thereof) to facilitate connection of the conductors of the impedance adaptor in a manner that may reduce manufacturing and/or subsequent assembly costs.

In some embodiments, the impedance adaptor has first and second transmission lines, each being provided by arm and having a first conductor and a second conductor being aligned such that one is on top of the other. The conductors may be arranged on the arms such that:

a first end of the first conductor of the first transmission line is proximate a first end of the second conductor of the first transmission line and a second end of the first conductor of the first transmission line is proximate a second end of the second conductor of the first transmission line, and a first end of the first conductor of the second transmission line is proximate a first end of the second conductor of the second transmission line and a second end of the first conductor of the second transmission line is proximate a second end of the second conductor of the second transmission line.

Respective arms of the impedance adaptor may be spaced apart and arranged such that the first conductor of the first transmission line is adjacent and co-planar with the first conductor of the second transmission line and the second conductor of the first transmission line is adjacent and co-planar with the second conductor of the second transmission line.

The first end of the first conductor of the first transmission line may be electrically coupled to the first end of the first conductor of the second transmission line by way of a continuation of the conductors between these ends. The first end of the second conductor of the first transmission line may be electrically coupled to the first end of the second conductor of the second transmission line by way of a continuation of the conductors between these ends.

In some embodiments, the transmission lines are supported by a suitable support which provide the arms. The transmission lines and/or support may be arranged so as to form a set of spaced apart arms on which each of the respective transmission lines are provided. In some embodiments, the support is provided by or in the form of a substrate. Other forms of support may also be provided. In some embodiments, the conductors are provided by conductive traces, while in other embodiments other forms of conductor may be used. In some embodiments, the impedance adaptor may be provided by a printed circuit board (PCB) having a substrate and conductive traces arranged to provide an impedance transformation from an input impedance to an output impedance. The impedance adaptor (and hence the substrate also, if provided) may be provided without a ground plane.

The impedance adaptor may be provided for integration in a form in which the second ends of the conductors of the transmission lines are not connected to any of the other conductors of the impedance adaptor. In this manner, when the impedance adaptor is in a pre-integration form (i.e. before the impedance adaptor is integrated into an apparatus), the second ends may be free of connections to any ends of any other conductors. The electrically coupled first ends and the free second ends may facilitate easy integration into the apparatus during assembly or manufacture of the apparatus. Further, the free second ends and the spaced apart arms may facilitate cooperation with one or more ferrite cores (e.g. where respective arms pass through openings or through-bores of the one or more ferrite cores) during integration into the apparatus.

In some embodiments of the present disclosure, the substrate on which the conductive traces of the impedance adaptor are disposed may be provided by a single piece of material. In some embodiments, the piece of material may be generally U-shaped, double U-shaped or figure-of-eight-shaped. The impedance adaptor may thus be provided as a single, integral part ready for integration into hardware. Such an arrangement of the impedance adaptor may facilitate cooperation with a ferrite core, such as a binocular ferrite core, singular or stacked toroidal core or the like. In particular, such an arrangement may provide an improved assembly process in that lengths or portions of the impedance adaptor may simply be introduced into and slid or moved through bores or through-holes of a ferrite core. With the lengths or portions of the impedance adaptor passing through and with ends thereof extending out from the ferrite core, only one or two or a few electrical connections may need to be made to provide an impedance adaptor ready for integration into the relevant hardware.

In some embodiments of the present disclosure, the conductive traces of the impedance adaptor may be tapered to improve impedance matching or impedance transformation properties of the impedance adaptor. For example, in some embodiments, one or more transmission lines of the impedance adaptor may have a width that tapers from a first end thereof to a second end thereof (or vice versa). For example, conductive traces providing the transmission line may taper in width from a first end thereof to a second end thereof. The taper may be arranged such that the width of the first end provides an impedance approximate an input impedance and the width of the second end provides an impedance approximate an output impedance.

The impedance adaptor according to aspects of the present disclosure may be provided ready for integration into hardware, or may be provided embedded or as part of an apparatus substrate, PCB design or the like.

One example embodiment of an impedance adaptor (110) according to aspects of the present disclosure is illustrated in FIGS. 1 to 5.

The impedance adaptor (110) includes a first transmission line (112) and a second transmission line (114). The first transmission line (112) includes a first conductive trace (122) and a second conductive trace (126) which is spaced apart from the first conductive trace (122). The second transmission line (114) includes a first conductive trace (124) and a second conductive trace (128) which is spaced apart from the first conductive trace (124).

The conductive traces (122, 124, 126, 128) of each of the first transmission line (112) and the second transmission line (114) may be aligned such that one trace (e.g. 122 or 124) is on top of the other (e.g. 126 or 128). In other words, the individual traces of each transmission line may have the same profile or outline and may be superimposed or overlaid (albeit in some cases with the substrate in-between) so as to provide a stacked arrangement as illustrated best in FIGS. 2 to 5.

The space (116, 118, 120) or volume between the first and second traces of each transmission line may be provided by an airgap, a vacuum or one or more portions of substrate. In some embodiments, for example, the conductive traces of each transmission line may be suspended or held apart using a suitable non-conductive mechanical means, such as a spacer, or the like. In other embodiments (e.g. those illustrated in FIGS. 7 to 10A, FIG. 11 or FIG. 12), the conductive traces of respective transmission lines may be formed on one or more portions of substrate. The one or more portions of substrate may be formed from discrete pieces of substrate material or may be integrally formed from the same piece of substrate material.

The arrangement of the first transmission line (112) may therefore be such that a first end (142) of the first trace (122) thereof is proximate a first end (144) of the second trace (126) thereof and a second end (146) of the first trace (122) thereof is proximate a second end (148) of the second trace (126) thereof. The arrangement of the second transmission line (114) may be such that a first end (152) of the first trace (124) thereof is proximate a first end (154) of the second trace (128) thereof and a second end (156) of the first trace (124) thereof is proximate a second end (158) of the second trace (128) thereof.

The transmission lines (112, 114) may be arranged such that the first conductive trace (122) of the first transmission line (112) is adjacent and co-planar with the first conductive trace (124) of the second transmission line (114) and the second conductive trace (126) of the first transmission line (112) is adjacent and co-planar with the second conductive trace (128) of the second transmission line (114). The arrangement may be such that while the conductive traces are adjacent, they are spaced apart by a distance (132) which may be in the order of approximately one to five times the width of the conductive traces. The two trace arms may be separated by a distance (132) so as to avoid magnetic flux coupling between the two arms. The transmission lines (112, 114) may further be arranged such that they extend along a length generally straight, side-by-side and/or parallel to one another.

The first end (142) of the first trace (122) of the first transmission line (112) is electrically coupled (160) to the first end (152) of the first trace (124) of the second transmission line (114). The first end (144) of the second trace (126) of the first transmission line (112) is electrically coupled (162) to the first end (154) of the second trace (128) of the second transmission line (114).

Electrical coupling (160) between the first end (142) of the first trace (122) of the first transmission line (112) to the first end (152) of the first trace (124) of the second transmission line (114), as well as the electrical coupling (162) between the first end (144) of the second trace (126) of the first transmission line (112) to the first end (154) of the second trace (128) of the second transmission line (114) may be provided by way of a solder bridge, a continuation of the traces, a wired connection or the like.

The second end (146) of the first trace (122) of the first transmission line (112) is capable of being or configured to be electrically coupled (164) to the second end (158) of the second trace (128) of the second transmission line (114). This connection may be made during integration of the impedance adaptor (110) into an apparatus (such as a communication device).

Such an arrangement may provide a 4:1 impedance adaptor in which:

- The first end (142) of the first trace (122) of the first transmission line (112) provides a port A;
- The first end (154) of the second trace (128) of the second transmission line (114) provides a port B;
- The second end (148) of the second trace (126) of the first transmission line (112) provides a port C; and,
- The second end (156) of the first trace (124) of the second transmission line (114) provides a port D.

A low impedance input of the impedance adaptor (110) is between ports A and B and a high impedance output of the impedance adaptor is between ports C and D when the second end (146) of the first trace (122) of the first transmission line (112) is electrically coupled (164) to the second end (158) of the second trace (128) of the second transmission line (114).

In other embodiments, other connections of the ends may be made to provide other transformation ratios.

Figure 6:
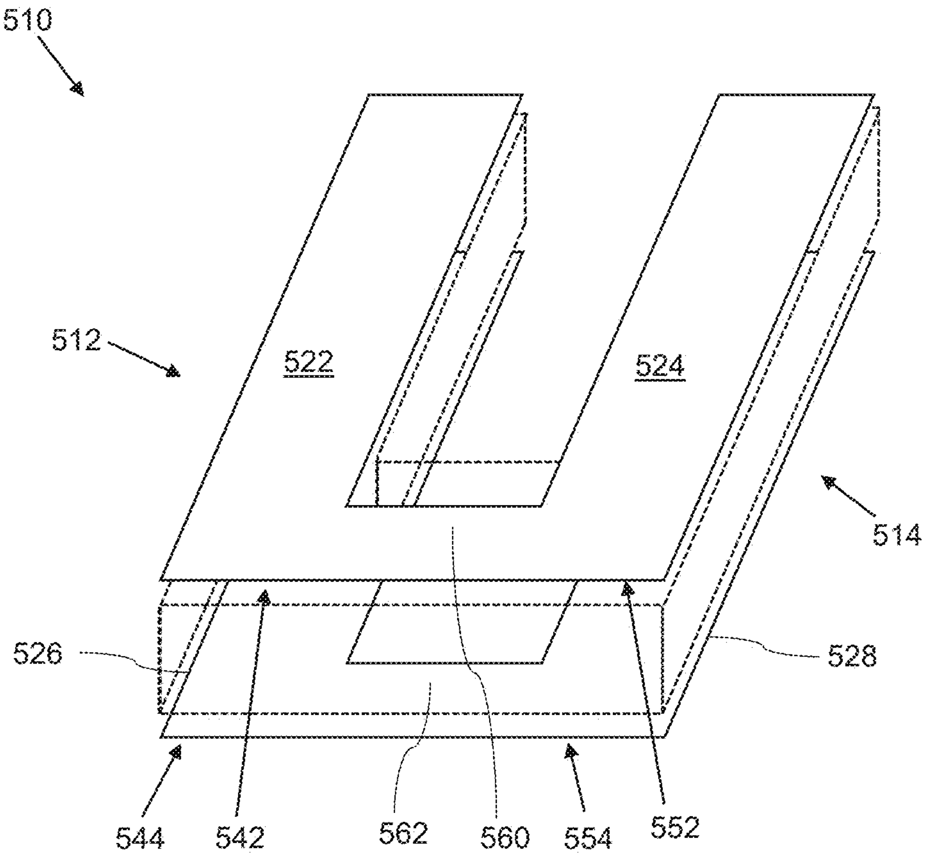
FIG. 6 is a three-dimensional schematic diagram which illustrates an impedance adaptor according to another embodiment of the present disclosure.

As mentioned above, in some embodiments, the electrical coupling (160, 162) of traces may be provided by way of a continuation of the traces. An example of such an embodiment is illustrated in FIG. 6, which similar to the embodiment illustrated in FIGS. 1 to 5 and in which like references refer to like features or components of the impedance adaptor. In the impedance adaptor (510) illustrated in FIG. 6, the electrical coupling (560) between first ends (542, 552) of the first trace (522) of the first transmission line (512) and the first trace (524) of the second transmission line (514) is provided by way of a continuation of the trace between those ends (542, 552). Similarly, the electrical coupling (562) between first ends (544, 554) of the second trace (526) of the first transmission line (512) and the second trace (528) of the second transmission line (514) is provided by way of a continuation of the trace between those ends (544, 554). The trace continuations need not be the same shape or width as that of the other traces (522, 524, 526, 528).

In the example embodiments described above with reference to FIGS. 1 to 6, the space between the conductive traces of respective transmission lines is illustrated in broken lines to facilitate illustration of the layered nature of the impedance adaptor. As mentioned, in some embodiments the space between the conductive traces may be an airgap or a vacuum. In other embodiments, the space between the conductive traces may be filled by a substrate for example being a solid material on which the conductive traces are formed.

Figure 7:
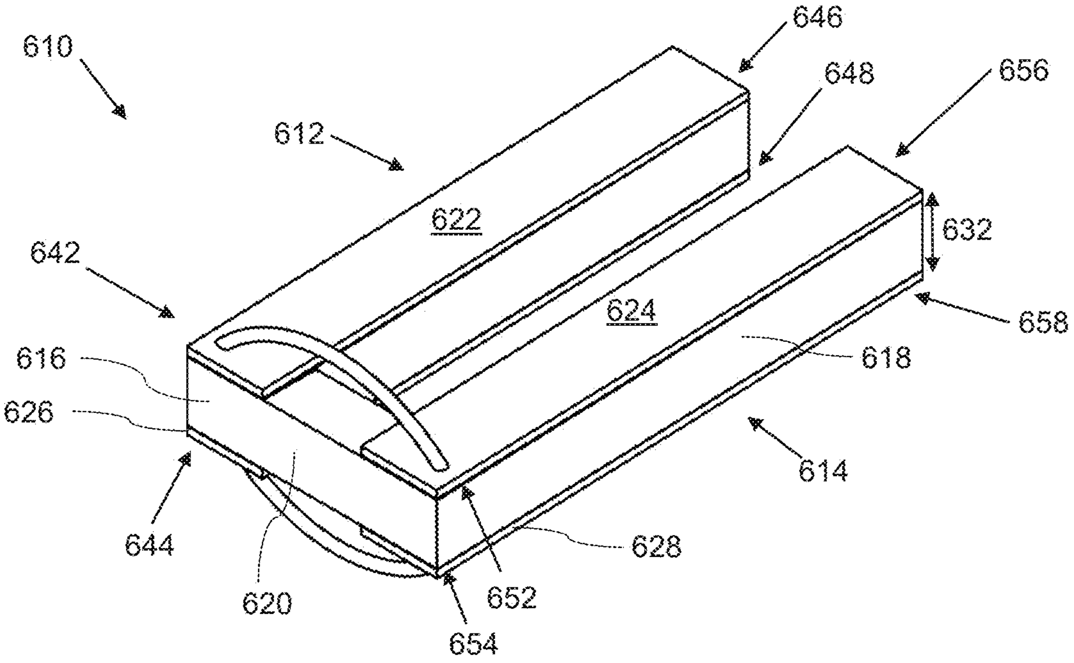
FIG. 7 is a three-dimensional view of an impedance adaptor according to yet another embodiment of the present disclosure in which conductive traces are disposed on a substrate.

An example embodiment of an impedance adaptor (610) in which conductive traces are disposed or formed on a substrate is illustrated in FIG. 7. The embodiment illustrated in FIG. 7 is similar to the embodiments described above with reference to FIGS. 1 to 6, and like references refer to like features or components of the impedance adaptor.

In the embodiment of the impedance adaptor (610) illustrated in FIG. 7, transmission lines (612, 614) are provided by a substrate having conductive traces provided thereon. In particular, the first transmission line (612) is provided by a portion of substrate (616) on which a first conductive trace (622) is disposed on a first major side thereof and a second conductive trace (626) is disposed on a second major side thereof. The second transmission line (614) is provided by a portion of substrate (618) on which a first conductive trace (624) is disposed on a first major side thereof and a second conductive trace (628) is disposed on a second major side thereof. The conductive traces (622, 624, 626, 628) of each of the first transmission line (612) and the second transmission line (614) may be aligned such that one trace (e.g. 622 or 624) is on top of the other (e.g. 626 or 628) in the direction of the thickness (632) of the portions of substrate (616, 618).

The substrate may be formed from any suitable substrate material, for example including one of: non-woven glass; woven glass; filled; or the like. The substrate material may contain magnetic material, such as ferrite, iron powder or the like. The substrate material may for example exhibit a relative permittivity or dielectric constant ($\varepsilon_r$) in the range of between 2.5 and 4.5. The substrate material may for example exhibit a volume resistivity or electrical resistivity (being a measure of insulation or electrical resistance of the material) in the range from $10^6$ to $10^{10}$ Megaohm-centimetres. The substrate material may for example exhibit a surface resistivity (or ρS, being electrical or insulation resistance of the material) in a range of between $10^6$ and $10^{10}$ Megaohms per square centimetre.

The conductive traces may be formed by etching the traces into a sheet of copper or other suitable conductor laminated onto either side of a sheet of substrate material. The conductive traces may for example be formed onto each side of a double-sided piece of substrate material (i.e. having a copper layer on each side of a substrate layer).

In some embodiments, the portions of substrate on which the conductive traces are formed may be integrally formed from a single piece of substrate material. In other embodiments, a portion of substrate providing a first transmission line and a portion of substrate providing the second transmission line may be provided by separate pieces of material (i.e., they are not integrally formed from a single piece of material).

In the embodiment illustrated in FIG. 7, the portion of substrate (616) providing the first transmission line (612) and the portion of substrate (618) providing the second transmission line (614) are integrally formed (e.g. they may be formed from one and the same piece of substrate material). The portions of substrate (616, 618) on which the conductive traces are provided form arms with an intermediate portion of substrate (620) extending between the two arms from one end thereof. The intermediate portion of substrate (620) extends between the arms towards first ends (642, 644, 652, 654) of the conductive traces (622, 626, 624, 628) and operates to space the arms, and hence the transmission lines (612, 614), apart. The substrate may be described as "U-shaped", with each transmission line (612, 614) extending along one of the arms of the "U".

The first end (642) of the first trace (622) of the first transmission line (612) is electrically coupled to the first end (652) of the first trace (624) of the second transmission line (614). The first end (644) of the second trace (626) of the first transmission line (612) is electrically coupled to the first end (654) of the second trace (628) of the second transmission line (614). Electrical coupling may be provided by way of a solder bridge, a continuation of the traces, a wired connection or the like.

The second end (646) of the first trace (622) of the first transmission line (612) is capable of being or configured to be electrically coupled (664) to the second end (658) of the second trace (628) of the second transmission line (614). This connection may be made during integration of the impedance adaptor (610) into an apparatus.

Figure 8:
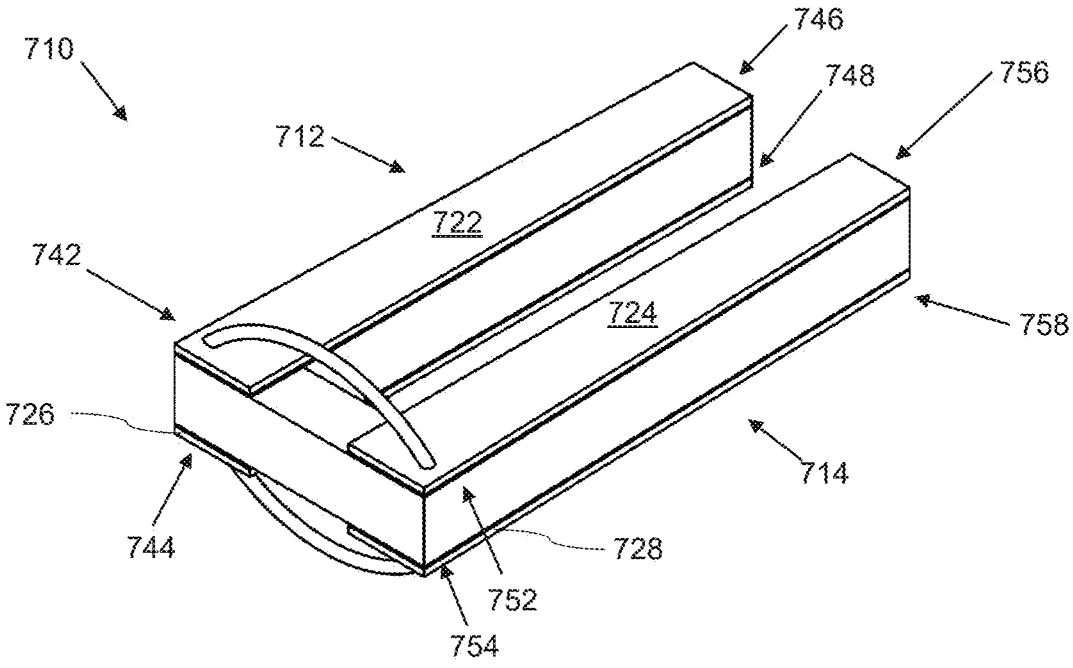
FIG. 8 is a three-dimensional view of an impedance adaptor according to yet another embodiment of the present disclosure in which widths of conductive traces taper from first ends thereof to second ends thereof.

As mentioned above, in some embodiments, the traces of one or both of a first transmission line and a second transmission line of the impedance adaptor have a width that tapers from a first end thereof to a second end thereof, or vice versa. An example of such an embodiment is illustrated in FIG. 8, which is similar to the embodiments illustrated in FIGS. 1 to 7 and in which like references refer to like features or components of the impedance adaptor. In the impedance adaptor of FIG. 8, traces (722, 726, 724, 728) of each of a first transmission line (712) and a second transmission line (714) have a width that tapers from first ends (742, 744, 752, 754) thereof to second ends (746, 748, 756, 758) thereof. The taper may be arranged such that the width of the first ends (742, 744, 752, 754) provide an impedance approximate an input impedance, and the width of the second ends (746, 748, 756, 758) provide an impedance approximate an output impedance. Tapering the widths of the traces of the transmission lines provides a more linear impedance response, which can improve the impedance matching properties of the impedance adaptor.

It should be appreciated that elements or features of the different embodiments described above may be combined in different ways. For example, an impedance adaptor having traces with tapered widths and electrical coupling by way of continuation of the traces may be provided. For example, an impedance adaptor having traces with tapered widths provided on discrete pieces or portions of substrate may be provided. The discrete nature in which the embodiments are described above is for the purpose of clarity and brevity and is not intended to limit elements or features of one embodiment to that embodiment only.

Figure 9:
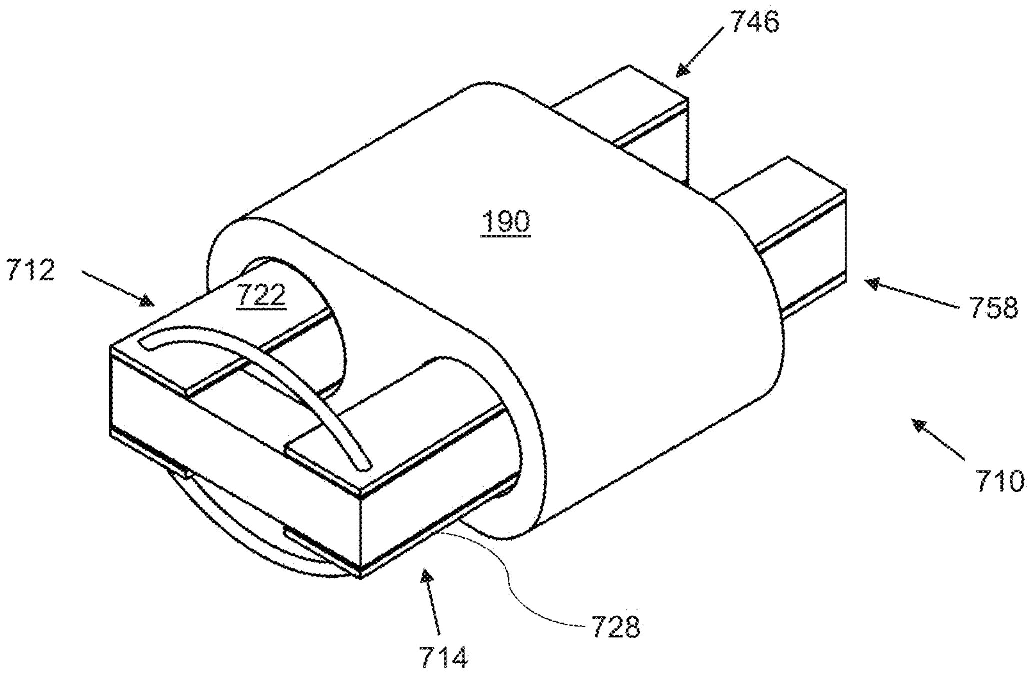
FIG. 9 is a three-dimensional view of the impedance adaptor of FIG. 8 cooperating with a ferrite core.

The impedance adaptor (110, 610, 710, 810) according to embodiments described herein may be configured to cooperate with a ferrite core. FIG. 9 illustrates cooperation with a ferrite core (190) of one example embodiment of an impedance adaptor (710) described herein. The generally U-shaped substrate of the impedance adaptor (710) may facilitate cooperation with a ferrite core (190). The cooperation may be such that arms of the impedance adaptor (710) pass through the respective openings or bores of the ferrite core (190) and extend out from opposite ends of the bores. With the arms of the impedance adaptor (710) passing through the ferrite core (190), only one electrical connection, being between the second end (746) of the first trace (722) of the first transmission line (712) and the second end (758) of the second trace (728) of the second transmission line (714), may need to be made to provide an impedance adaptor ready for integration into the relevant hardware.

Figure 10B:
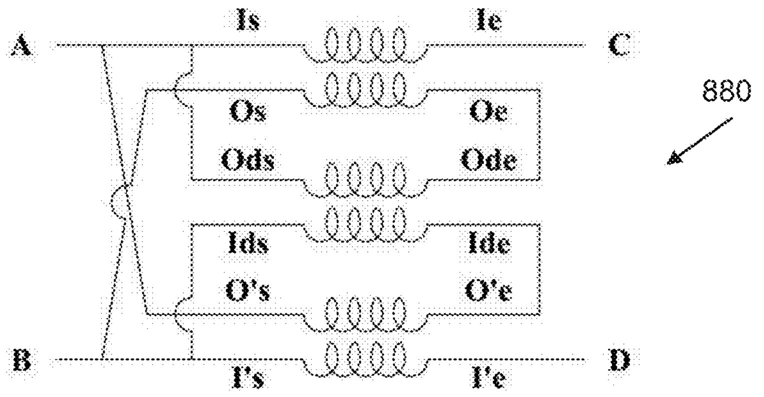
FIG. 10B is a schematic diagram which illustrates an equivalent circuit of the embodiment of the impedance adaptor illustrated in FIG. 10A.
Figure 10A:
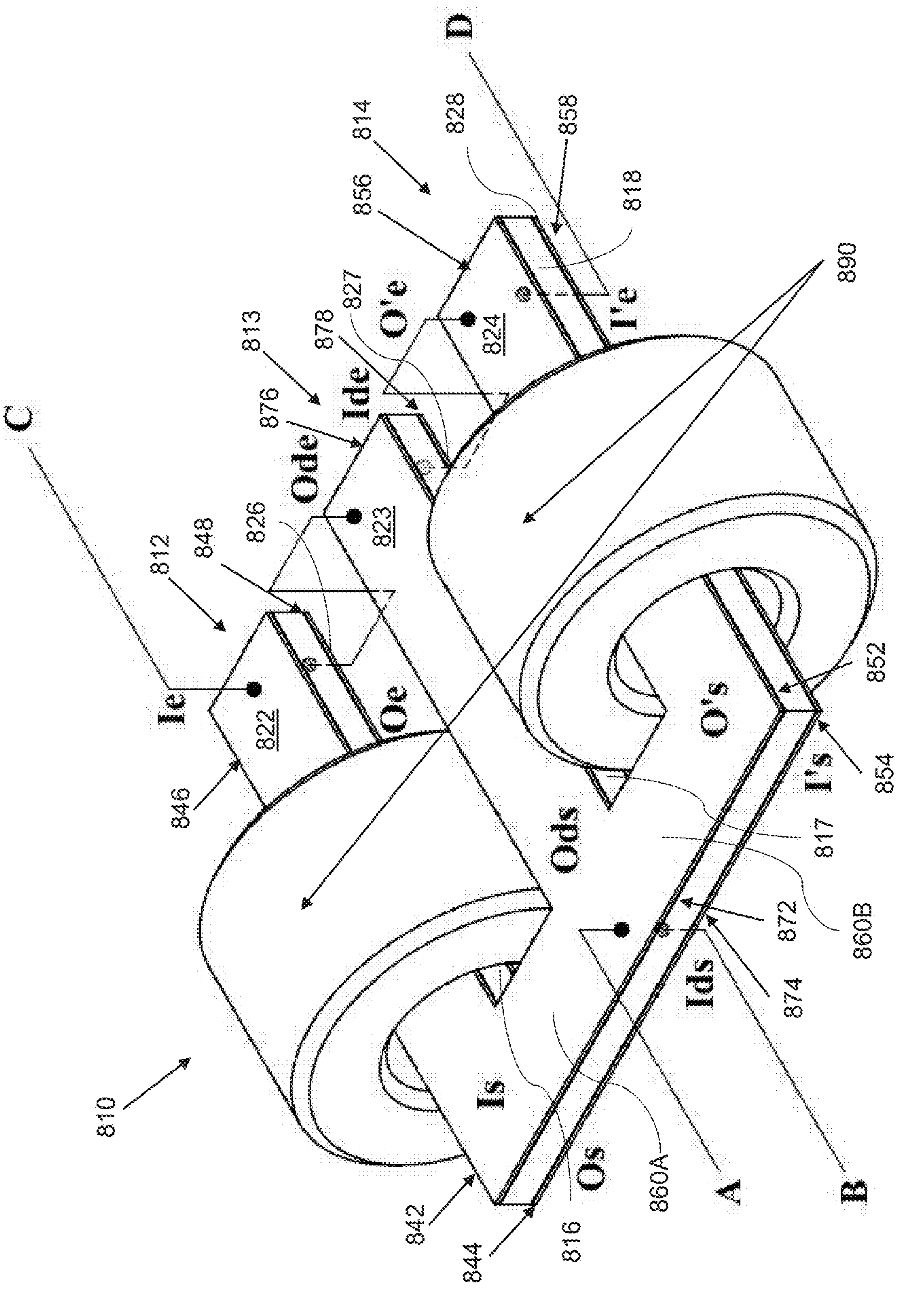
FIG. 10A is a three-dimensional view of an impedance adaptor according to yet another embodiment of the present disclosure.

Another example embodiment of an impedance adaptor according to aspects of the present disclosure is illustrated in FIG. 10A.

The embodiment illustrated in FIG. 10A is similar to the embodiments described above with reference to FIGS. 1 to 5, FIG. 6, FIG. 7 or FIG. 8, and like references refer to like features or components of the impedance adaptor.

The impedance adaptor (810) illustrated in FIG. 10A differs primarily in that it includes a central transmission line (813) in addition to and in between a first transmission line (812) and a second transmission line (814).

Each of the transmission lines (812, 813, 814) is provided by a first conductive trace (822, 823, 824) and a second conductive trace (826, 827, 828). The conductive traces of each transmission line are aligned such that one is on top of the other (i.e. in a stacked arrangement). In the illustrated embodiments, the conductive traces of each transmission line are provided on respective portions of substrate (816, 817, 818), although in other embodiments they may be spaced apart by an airgap or a vacuum. The portions of substrate may be integrally formed (i.e. they may be formed from a single piece of substrate material).

The transmission lines (812, 813, 814) may be arranged such that the first conductive trace (822) of the first transmission line (812) is adjacent and co-planar with the first conductive trace (823) of the central transmission line (813) which in turn is adjacent and co-planar with the first conductive trace (824) of the second transmission line (814). The second conductive trace (826) of the first transmission line (812) is adjacent and co-planar with the second conductive trace (827) of the central transmission line (813) which in turn is adjacent and coplanar with the second conductive trace (828) of the second transmission line (814). The arrangement may be such that while the conductive traces are adjacent and coplanar, they are spaced apart by a distance which may be in the order of approximately one to five times the width of the conductive traces. The transmission lines (812, 813, 814) may further be arranged such that they extend along a length generally side-by-side and parallel to one another.

The first end (842) of the first trace (822) of the first transmission line (812), the first end (872) of the first trace (823) of the central transmission line (813) and the first end (852) of the first trace (824) of the second transmission line (814) are electrically coupled (860A, 860B) to one another, in the illustrated embodiment by way of a continuation of the conductive traces between these ends. Similarly, the first end (844) of the second trace (826) of the first transmission line (812), the first end (874) of the second trace (827) of the central transmission line (813) and the first end (854) of the second trace (828) of the second transmission line (814) are electrically coupled to one another, in the illustrated embodiment being by way of a continuation of the conductive traces between these ends.

The second end (846) of the first trace (822) of the first transmission line (812) is adjacent the second end (876) of the first trace (823) of the central transmission line (813), which in turn is adjacent the second end (856) of the first trace (824) of the second transmission line (814). Similarly, the second end (848) of the second trace (826) of the first transmission line (812) is adjacent the second end (878) of the second trace (827) of the central transmission line (813), which in turn is adjacent the second end (858) of the second trace (828) of the second transmission line (814).

In the embodiment illustrated in FIG. 10A, ferrite cores in the form of toroidal ferrite cores (890) are fitted to each of the first and second transmission lines (812, 814) of the impedance adaptor (810).

The second end (484) of the second trace (826) of the first transmission line (812) is capable of being or is configured to be electrically coupled to the second end (876) of the first trace (823) of the central transmission line (813). Further, the second end (856) of the first trace (824) of the second transmission line (814) is capable of being or is configured to be electrically coupled to the second end (878) of the second trace (827) of the central transmission line (813). These connections may be made during integration of the impedance adaptor (810) into an apparatus.

Such an arrangement may provide a 9:1 equal delay impedance adaptor in which:

- The first end (842) of the first trace (822) of the first transmission line (812) provides a port A (although this connection may be made at the first end of the first trace of the central transmission line);
- The first end (854) of the second trace (828) of the second transmission line (814) provides port B (although this connection may be made at the first end of the second trace of the central transmission line);
- The second end (848) of the first trace (822) of the first transmission line (812) provides a port C; and,
- The second end (858) of the second trace (828) of the second transmission line (814) provides a port D.

A low impedance input of the impedance adaptor (810) is between ports A and B and a high impedance output of the impedance adaptor is between ports C and D.

Providing a central transmission line may allow the ends of the conductive traces to be connected without needing to bend the lines to the one side, which may be more practical to realise. The central transmission line may not require any ferrite loading and may act simply as a balanced delay line.

Figure 10C:
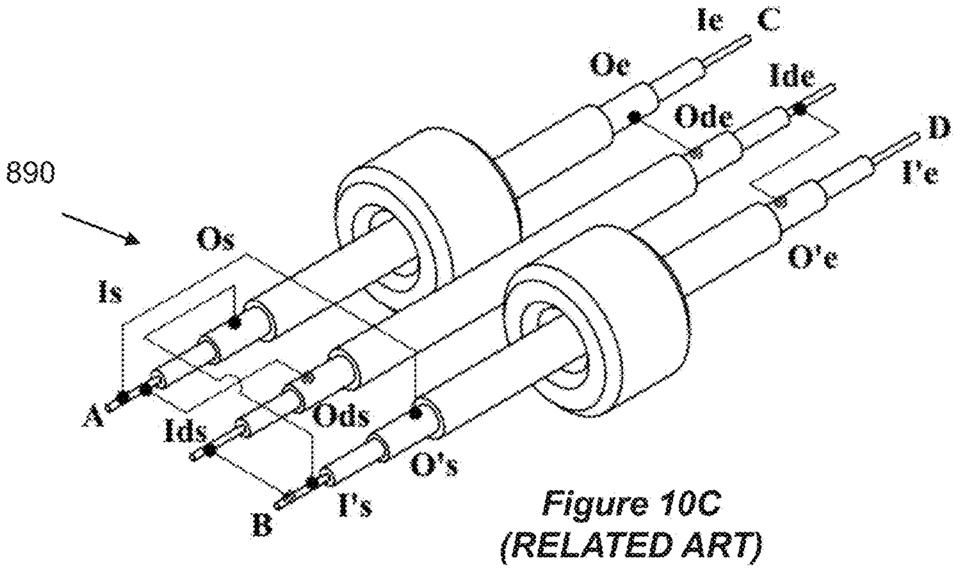
Figure 10C (RELATED ART)
FIG. 10C is a schematic diagram which illustrates a related art impedance adaptor which is electrically equivalent to the impedance adaptor illustrated in FIG. 10A and which is made using coaxial cable.

A schematic illustration of an equivalent transmission line circuit (880) of the impedance adaptor (810) of FIG. 10A is shown in FIG. 10B. A schematic diagram which illustrates a related art impedance adaptor (890) made using coaxial cable and which is electrically equivalent to the impedance adaptor illustrated in FIG. 10A is shown in FIG. 10C. FIGS. 10A to 10 C illustrate electrical connections between points Is, Ide, Ids, Os, Oe, Ods, Ods, I's, O's, O'e and I'e required to implement a 9:1 impedance adaptor. The Figures also illustrate the ports A, B, C and D.

Figure 11:
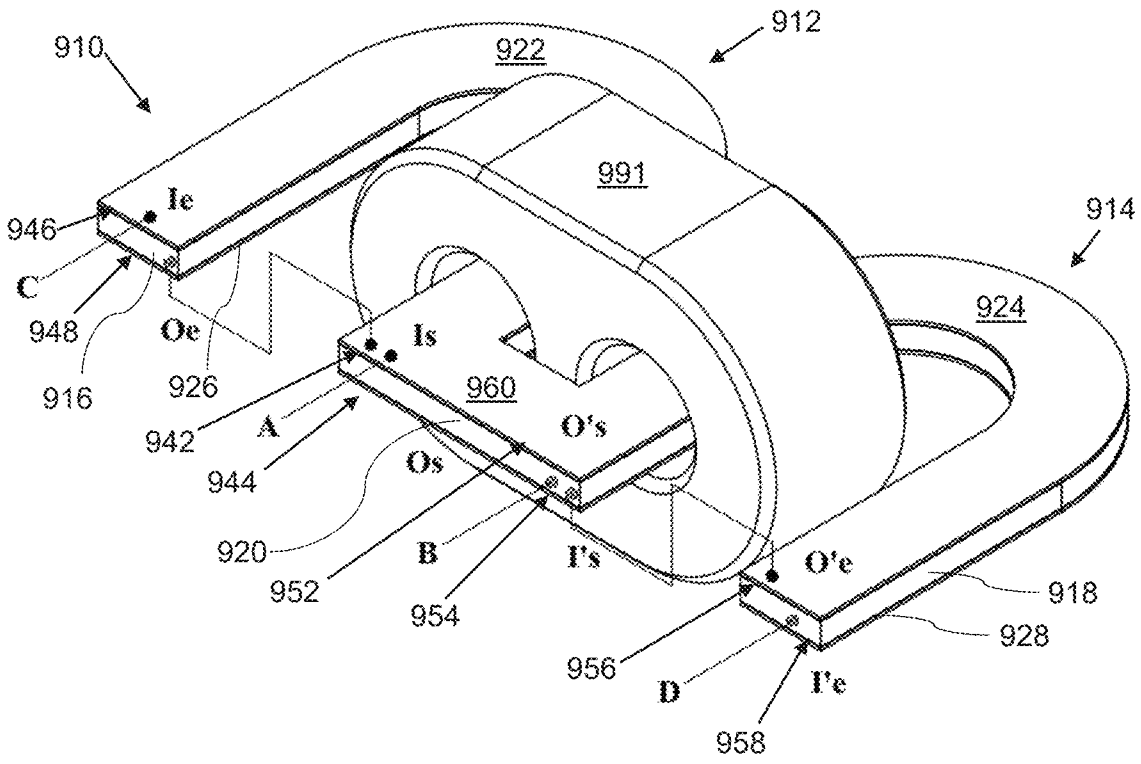
FIG. 11 is a three-dimensional view of an impedance adaptor according to yet another embodiment of the present disclosure.

Another example embodiment of an impedance adaptor according to aspects of the present disclosure is illustrated in FIG. 11. The embodiment illustrated in FIG. 11 is similar to the embodiments described above with reference to FIGS. 1 to 8, and like references refer to like features or components of the impedance adaptor.

The impedance adaptor (910) illustrated in FIG. 11 differs primarily in that the first transmission line (912) and the second transmission line (914) each include a bend approximately midway along their respective lengths. The bend is such that each of the transmission lines has a U-shape. In this manner, second ends (946, 948) of the first trace (922) and second trace (926) of the first transmission line (912) are located adjacent first ends (942, 944) of the first and second trace of the first transmission line (912), respectively. Similarly, second ends (956, 958) of the first trace (924) and second trace (928) of the second transmission line (914) are located adjacent first ends (952, 954) of the first and second trace of the second transmission line (914), respectively.

The first end (942) of the first trace (922) of the first transmission line (912) may be electrically coupled (960) to the first end (952) of the first trace (924) of the second transmission line (914), in the illustrated embodiment being by way of a continuation of the conductive traces (922, 924). Similarly, the first end (944) of the second trace (926) of the first transmission line (912) is electrically coupled to the first end (954) of the second trace (928) of the second transmission line (914), in the illustrated embodiment being by way of a continuation of the conductive traces (926, 928).

The portion of substrate (916) on which the first and second traces (922, 926) of the first transmission line (912) and the portion of substrate (918) on which the first and second traces (924, 928) of the second transmission line (914) as well as the intermediate portion of substrate (920) extending therebetween may be provided by a single piece of material such that the impedance adaptor is in the form of a single, integral unit.

In the embodiment illustrated in FIG. 11, a ferrite core (991) in the form of a binocular ferrite core may be fitted to the impedance adaptor (910), with adjacent portions of the first and second transmission lines (912, 914) extending through bores of the ferrite core.

The second end (946) of the second trace (926) of the first transmission line (912) may be capable of being or may be configured to be electrically coupled to the first end (942) of the first trace (922) of the first transmission line (912). Further, the second end (956) of the first trace (924) of the second transmission line (914) may be capable of being or may be configured to be electrically coupled to the first end (954) of the second trace (928) of the second transmission line (914). This connection may be made during integration of the impedance adaptor (910) into an apparatus (such as a communication device).

Such an arrangement may provide a 9:1 impedance adaptor in which:

- The first end (942) of the first trace (922) of the first transmission line (912) provides a port A;
- The first end (954) of the second trace (928) of the second transmission line (914) provides a port B;
- The second end (948) of the first trace (922) of the first transmission line (912) provides a port C; and,
- The second end (958) of the second trace (928) of the second transmission line (914) provides a port D.

A low impedance input of the impedance adaptor (910) is between ports A and B and a high impedance output of the impedance adaptor is between ports C and D.

Other configurations of a 9:1 impedance adaptor according to aspects of the present disclosure may also be provided. For example, in FIG. 12, an example embodiment of a 9:1 impedance adaptor (970) is illustrated in which each of the two transmission lines are hook-shaped such that the first ends of the first and second traces of the first transmission line are proximate the second ends of the first and second traces of the first transmission line. Similarly, in this manner, the first ends of the first and second traces of the second transmission line are proximate the second ends of the first and second traces of the second transmission line. Instead of a binocular ferrite core, the embodiment of the impedance adaptor (970) in FIG. 12 has a number of toroidal ferrite cores (992) fitted thereto.

Figure 13:
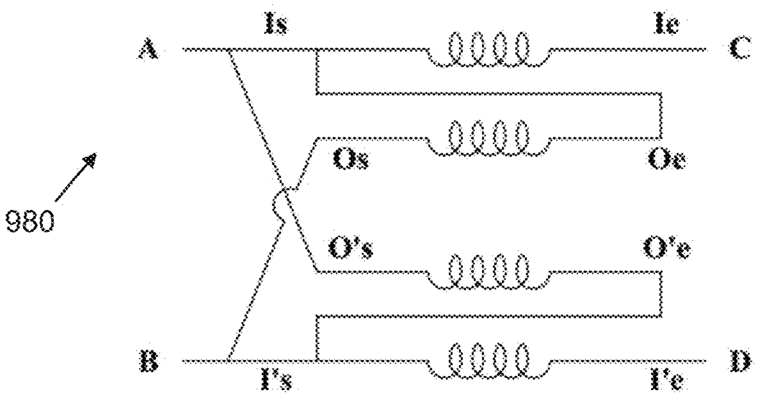
FIG. 13 is a schematic diagram which illustrates an equivalent circuit of the embodiment of the impedance adaptor illustrated in FIG. 11 or 12.
Figure 14:
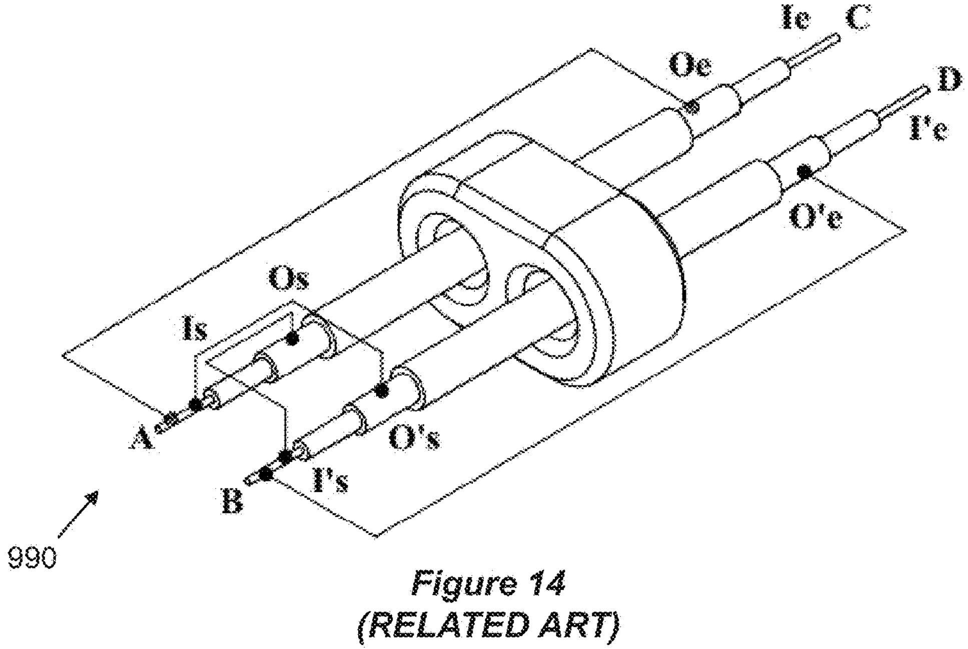
Figure 14 (RELATED ART)
FIG. 14 is a schematic diagram which illustrates a related art impedance adaptor which is electrically equivalent to the impedance adaptor illustrated in FIG. 11 or 12 and which is made using coaxial cable.
Figure 12:
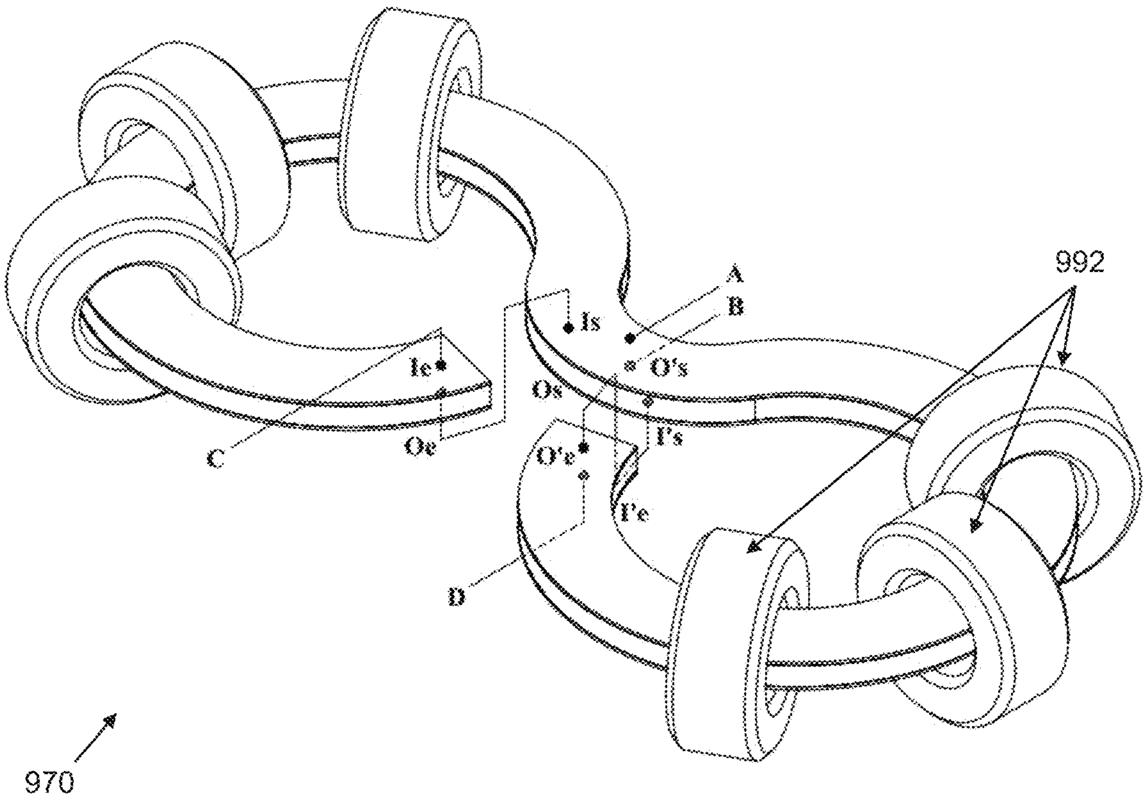
FIG. 12 is a three-dimensional view of an impedance adaptor according to yet another embodiment of the present disclosure.

A schematic illustration of an equivalent transmission line circuit (980) of the 9:1 impedance adaptors (910, 970) of FIGS. 11 and 12 is shown in FIG. 13. A schematic diagram which illustrates a related art impedance adaptor (990) made using coaxial cable and which is electrically equivalent to the impedance adaptor illustrated in FIG. 11 or 12 is shown in FIG. 14. FIGS. 11 to 14 illustrate electrical connections between points Is, Os, Oe, le, I's, O's, O'e and I'e which are required to implement a 9:1 impedance adaptor. The Figures also illustrate the ports A, B, C and D.

Other embodiments of the impedance adaptor according to aspects of the present disclosure may be provided mutatis mutandis for other transformation ratios. For example an impedance adaptor as described herein mutatis mutandis and providing a transformation ratio of 2.25:1, 6.25:1 or the like may be provided.

The components of the impedance adaptor (110, 610, 710, 810, 910, 970) according to embodiments of the present disclosure may be provided as an assembled or integral unit ready for integration into the relevant hardware with minimal further assembly. The impedance adaptor (110, 510, 610, 710, 810, 910, 970) may for example be provided requiring only one electrical connection (e.g., in the case of a 4:1 transformation ratio) or two electrical connections (e.g., in the case of a 9:1 transformation ratio) to be made after a ferrite core is fitted thereon. Aspects of the present disclosure may therefore provide a simple, cost-effective impedance adaptor that is relatively easy to integrate into hardware.

Figure 15:
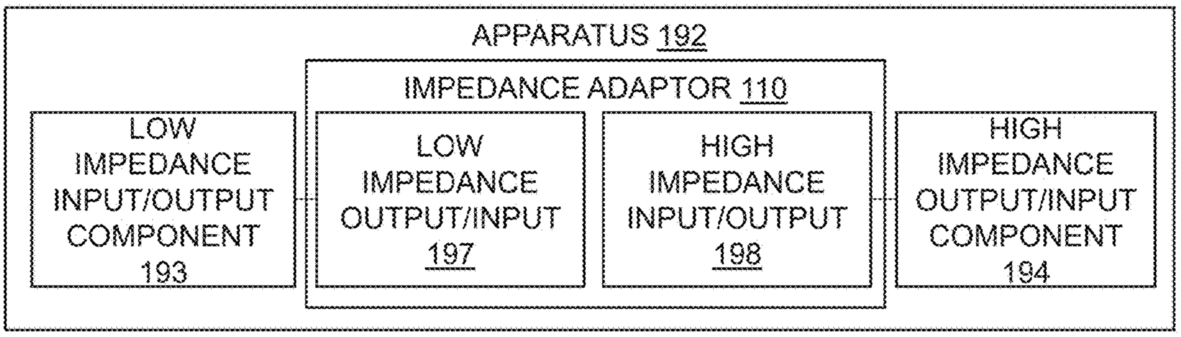
FIG. 15 is a block diagram which illustrates an impedance adaptor according to embodiments of the present disclosure integrated into hardware.

FIG. 15 is a block diagram which illustrates integration of an impedance adaptor (110) according to embodiments of the present disclosure integrated into hardware, such as an apparatus (192). The apparatus may be a radio frequency amplifier, an antenna system, a communication device (such as a two-way radio) or the like. The apparatus (192) includes a low impedance input/output component (193) and a high impedance output/input component (194). A low impedance output/input (197) of the impedance adaptor (110), e.g. being between ports A and B, is connected to the low impedance input/output component (193). A high impedance input/output (198) of the impedance adaptor (110), e.g. being between ports C and D, is connected to the high impedance output/input component (194). The impedance adaptor (110) thus matches the low impedance output of the low impedance output component (193) to the high impedance input of the high impedance input component (194).

In the case of the impedance adaptor being a 4:1 impedance transformer, the second end of the first trace of the first transmission line is electrically coupled to the second end of the second trace of the second transmission line.

In the case of the impedance adaptor being a 9:1 impedance transformer, the second end of the second trace of the first transmission line is electrically coupled to the first end of the first trace of the first transmission line. The second end of the first trace of the second transmission line is electrically coupled to the first end of the second trace of the second transmission line.

In the case of the impedance adaptor including a central a central transmission line, the second end of the second trace of the first transmission line is electrically coupled to a second end of a first trace of the central transmission line. The second end of the first trace of the second transmission line is electrically coupled to a second end of a second trace of the central transmission line.

Aspects of the present disclosure provide a balanced transmission line in the form of a printed circuit board or other construction material that has broadside coupled tracks, traces or conductors. The spacing between the traces are such that the capacitance is varied over the area between the two traces over its length with or without a dielectric material. The inductance is realized across the length of the traces. The combination of capacitance (C) and inductance (L) creates the impedance ($Z_o$) of the transmission line per unit length, according to the formula:

$$Z_0 = \sqrt{\frac{L}{C}}$$

Aspects of the present disclosure provide a printed circuit board arranged to provide a wideband, non-flux or equal delay transmission line impedance transformer or adaptor. In particular, aspects of the present disclosure provide what may be termed "an inverted" impedance adaptor arrangement in which the first end of the first trace of the first transmission line is connected to the first end of the first trace of the second transmission line and the first end of the second trace of the first transmission line is connected to the first end of the second trace of the second transmission line. This may allow a substrate on which the conductive traces are disposed to be formed from a single piece of material.

The optimum impedance may therefore be realized by changing the width of the two traces along the line, thus changing the characteristic impedance of the transmission line for optimum propagation and matching. The transformer may be so constructed as to allow for the inclusion of ferrite or other magnetic material, simplifying the construction and manufacturing of transmission line transformers for low frequency and/or broadband applications.

Coaxial transmission lines may therefore be replaced in the construction of a transmission line transformer with aspects of the present disclosure. Consequently the use of a broadside coupled line with no reference to a ground conductor as a return, and used as a balanced transmission line to replace the coaxial transmission line, may find use as a transforming adaptor.

The aforementioned configurations and the use of a single material may reduce the complexity of manufacture while providing a scalable impedance adaptor that may more accurately match impedances than previous solutions. The disclosed embodiments may also be configured to produce symmetrical power losses which in turn may provide more satisfactory harmonic attenuation. Moreover, the use of traces on a printed circuit board for providing transmission lines may allow for the use of (more expensive) higher quality conductors because the amount of required material may be less than what is needed for twisted wire configurations.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims. Finally, throughout the specification and accompanying claims, unless the context requires otherwise, the word 'comprise' or variations such as 'comprises' or 'comprising' will be understood to imply the inclusion of a stated integer or group of integers but not the exclusion of any other integer or group of integers.

The invention claimed is:

1. An impedance adaptor comprising a first transmission line and a second transmission line, each of the first transmission line and the second transmission line being provided by an arm and having a first conductor and a second conductor, the conductors of each of the first transmission line and the second transmission line being aligned such that one is on top of another, with:

a first end of the first conductor of the first transmission line being proximate a first end of the second conductor of the first transmission line and a second end of the first conductor of the first transmission line being proximate a second end of the second conductor of the first transmission line, and a first end of the first conductor of the second transmission line being proximate a first end of the second conductor of the second transmission line and a second end of the first conductor of the second transmission line being proximate a second end of the second conductor of the second transmission line, wherein respective arms providing the first transmission line and the second transmission line are spaced apart and arranged such that the first conductor of the first transmission line is adjacent and co-planar with the first conductor of the second transmission line and the second conductor of the first transmission line is adjacent and co-planar with the second conductor of the second transmission line, wherein the first end of the first conductor of the first transmission line is electrically coupled to the first end of the first conductor of the second transmission line by way of a continuation of the conductor between these ends, and wherein the first end of the second conductor of the first transmission line is electrically coupled to the first end of the second conductor of the second transmission line by way of a continuation of the conductor between these ends, wherein the impedance adaptor is provided for integration in a form in which the second ends of the conductors of the transmission lines are not connected to any other conductors of the impedance adaptor, and wherein each of the first transmission line and the second transmission line is provided by respective portions of a substrate having the first conductor of that transmission line on a first major side of the portion of substrate and the second conductor of that transmission line on a second major side of the portion of substrate.

2. The impedance adaptor as claimed in claim 1, wherein the transmission lines are supported by a support forming a set of spaced apart arms on which each of the respective transmission lines are provided.

3. The impedance adaptor as claimed in claim 1, wherein the portion of substrate providing the first transmission line and the portion of substrate providing the second transmission line are integrally formed, wherein the portions of substrate on which the conductors are provided form arms with an intermediate portion of substrate extending between the two arms from one end thereof so as to space the arms and the transmission lines apart.

4. The impedance adaptor as claimed in claim 1, wherein the portions of substrate providing the first transmission line and the second transmission line are integrally formed from a single piece of substrate material.

5. The impedance adaptor as claimed in claim 1, wherein the conductors of each of the first transmission line and the second transmission line are aligned such that one is on top of the other in a direction of a thickness of the substrate.

6. The impedance adaptor as claimed in claim 1, wherein each of the first conductor and the second conductor of each of the first transmission line and the second transmission line is provided by a conductive trace.

7. The impedance adaptor as claimed in claim 6, wherein each of the first conductive trace and the second conductive trace of one or both of the first transmission line and the second transmission line taper in width from the first end thereof to the second end thereof, or from the second end thereof to the first end thereof.

8. The impedance adaptor as claimed in claim 7, wherein the taper is arranged such that the width of the first end provides an impedance approximate an input impedance and the width of the second end provides an impedance approximate an output impedance.

9. The impedance adaptor as claimed in claim 1, wherein the second end of the first conductor of the first transmission line is capable of being electrically coupled to the second end of the second conductor of the second transmission line, wherein:

the first end of the first conductor of the first transmission line provides a port A;

the first end of the second conductor of the second transmission line provides a port B;

the second end of the second conductor of the first transmission line provides a port C; and, the second end of the first conductor of the second transmission line provides a port D, and wherein the impedance adaptor is a 4:1 impedance transformer in which a low impedance input is between ports A and B and a high impedance output is between ports C and D.

10. The impedance adaptor as claimed in claim 9, wherein the conductors of each of the first transmission line and the second transmission line are generally straight between their respective ends.

11. The impedance adaptor as claimed in claim 1, wherein the substrate is U-shaped having two, spaced apart arms joined together at one end thereof, with each transmission line extending along one of the arms.

12. The impedance adaptor as claimed in claim 1, wherein the second end of the second conductor of the first transmission line is capable of being electrically coupled to the first end of the first conductor of the first transmission line, wherein the second end of the first conductor of the second transmission line is capable of being electrically coupled to the first end of the second conductor of the second transmission line, wherein:

the first end of the first conductor of the first transmission line provides a port A;

the first end of the second conductor of the second transmission line provides a port B;

the second end of the first conductor of the first transmission line provides a port C; and, the second end of the second conductor of the second transmission line provides a port D, wherein the impedance adaptor is a 9:1 impedance transformer in which a low impedance input is between ports A and B and a high impedance output is between ports C and D.

13. The impedance adaptor as claimed in claim 12, wherein the conductors of each of the first transmission line and the second transmission line are arranged in a U-shape such that the ends of a first conductive trace and a second conductive trace are proximate one another.

14. The impedance adaptor as claimed in claim 12, wherein the conductors of each of the first transmission line and the second transmission line are arranged in a hook-shape such that the ends of a first conductive trace and a second conductive trace are proximate one another.

15. The impedance adaptor as claimed in claim 12, including a central transmission line, wherein the first end of the first conductor of the first transmission line, a first end of a first conductor of the central transmission line and the first end of the first conductor of the second transmission line are electrically coupled to one another, and wherein the first end of the second conductor of the first transmission line, a first end of a second conductor of the central transmission line and the first end of the second conductor of the second transmission line are electrically coupled to one another.

16. The impedance adaptor as claimed in claim 1, wherein portions of the substrate providing each of the first transmission line and second transmission line respectively are U-shaped, wherein an end of each of the U-shaped portions of substrate are joined together by an intermediate portion of substrate.

17. The impedance adaptor as claimed in claim 1, wherein portions of the substrate providing each of the first transmission line and second transmission line respectively are hook-shaped, wherein an end of each of the hook-shaped portions of substrate are joined together by an intermediate portion of substrate.

18. An apparatus including an impedance adaptor comprising a first transmission line and a second transmission line, each of the first transmission line and the second transmission line being provided by an arm and having a first conductor and a second conductor, the conductors of each of the first transmission line and the second transmission line being aligned such that one is on top of another, with:

a first end of the first conductor of the first transmission line being proximate a first end of the second conductor of the first transmission line and a second end of the first conductor of the first transmission line being proximate a second end of the second conductor of the first transmission line, and a first end of the first conductor of the second transmission line being proximate a first end of the second conductor of the second transmission line and a second end of the first conductor of the second transmission line being proximate a second end of the second conductor of the second transmission line, wherein respective arms providing the first transmission line and the second transmission line are spaced apart and arranged such that the first conductor of the first transmission line is adjacent and co-planar with the first conductor of the second transmission line and the second conductor of the first transmission line is adjacent and co-planar with the second conductor of the second transmission line, wherein the first end of the first conductor of the first transmission line is electrically coupled to the first end of the first conductor of the second transmission line by way of a continuation of the conductor between these ends, and wherein the first end of the second conductor of the first transmission line is electrically coupled to the first end of the second conductor of the second transmission line by way of a continuation of the conductor between these ends, and wherein the second end of the first conductor of the first transmission line is electrically coupled to the second end of the second conductor of the second transmission line, and wherein the impedance adaptor is a 4:1 impedance transformer.

19. An apparatus including an impedance adaptor comprising a first transmission line and a second transmission line, each of the first transmission line and the second transmission line being provided by an arm and having a first conductor and a second conductor, the conductors of each of the first transmission line and the second transmission line being aligned such that one is on top of another, with:

a first end of the first conductor of the first transmission line being proximate a first end of the second conductor of the first transmission line and a second end of the first conductor of the first transmission line being proximate a second end of the second conductor of the first transmission line, and a first end of the first conductor of the second transmission line being proximate a first end of the second conductor of the second transmission line and a second end of the first conductor of the second transmission line being proximate a second end of the second conductor of the second transmission line, wherein respective arms providing the first transmission line and the second transmission line are spaced apart and arranged such that the first conductor of the first transmission line is adjacent and co-planar with the first conductor of the second transmission line and the second conductor of the first transmission line is adjacent and co-planar with the second conductor of the second transmission line, wherein the first end of the first conductor of the first transmission line is electrically coupled to the first end of the first conductor of the second transmission line by way of a continuation of the conductor between these ends, and wherein the first end of the second conductor of the first transmission line is electrically coupled to the first end of the second conductor of the second transmission line by way of a continuation of the conductor between these ends, and wherein the second end of the second conductor of the first transmission line is electrically coupled to the first end of the first conductor of the first transmission line, wherein the second end of the first conductor of the second transmission line is electrically coupled to the first end of the second conductor of the second transmission line, and wherein the impedance adaptor is a 9:1 impedance transformer.

* * * * *